(12) United States Patent
Vogel

(10) Patent No.: US 8,830,452 B2
(45) Date of Patent: Sep. 9, 2014

(54) GEODETIC TARGET AND POSITION DETERMINATION SYSTEM

(71) Applicant: TRIMBLE Jena GmbH, Jena (DE)

(72) Inventor: Michael Vogel, Schleifreisen (DE)

(73) Assignee: TRIMBLE Jena GmbH, Jena (DE)

( * ) Notice: Subject to any disclaimer, the term of this patent is extended or adjusted under 35 U.S.C. 154(b) by 0 days.

(21) Appl. No.: 13/913,070

(22) Filed: Jun. 7, 2013

(65) Prior Publication Data
US 2013/0329218 A1 Dec. 12, 2013

(30) Foreign Application Priority Data
Jun. 8, 2012 (DE) .......................... 10 2012 011 518

(51) Int. Cl.
*G01B 11/26* (2006.01)

(52) U.S. Cl.
USPC .................. 356/139.1; 356/3.01; 356/141.1; 356/139.09; 356/152.2; 356/399; 250/206.1; 33/366.16; 398/156

(58) Field of Classification Search
USPC .......... 356/139.1, 3.01, 141.1, 139.09, 152.2, 356/399; 250/366.16, 206.1; 33/206.1, 33/366.16; 398/156
See application file for complete search history.

(56) References Cited

U.S. PATENT DOCUMENTS

| 5,255,441 | A | 10/1993 | Burgess et al. | |
|---|---|---|---|---|
| 7,155,240 | B2 * | 12/2006 | Atkinson et al. | 455/456.2 |
| 7,588,535 | B2 * | 9/2009 | Adler et al. | 600/109 |
| 7,623,224 | B2 * | 11/2009 | Vogel | 356/141.5 |
| 7,646,339 | B2 * | 1/2010 | Green et al. | 342/357.34 |
| 2002/0023361 | A1 | 2/2002 | Jackson et al. | |
| 2005/0057745 | A1 * | 3/2005 | Bontje | 356/139.03 |
| 2008/0036646 | A1 | 2/2008 | Green et al. | |

FOREIGN PATENT DOCUMENTS

EP 1130355 A2 9/2001

* cited by examiner

*Primary Examiner* — Isam Alsomiri
*Assistant Examiner* — Samantha K Abraham
(74) *Attorney, Agent, or Firm* — Kilpatrick Townsend & Stockton LLP

(57) ABSTRACT

A geodetic target 1 for use in geodesy comprises an orienting device 10 with a bearing direction P, a first inclinometer 20 with a first axis of inclination 20A, a reflector 30 reflecting incident measurement beams S, an imaging optics 40 that focuses the incident measurement beams S, a matrix sensor 50, whose receiving surface 51 is situated in an image plane of the imaging optics 40, and an interface 60, which is connected to the first inclinometer 20 and the matrix sensor 50. The spatial arrangement and orientation of the optical axis and/or axis of symmetry 30A of the reflector 30 relative to the bearing direction P of the orienting device 10 is predetermined here. The first axis of inclination 20A makes an angle α other than zero with an optical axis 40A of the imaging optics 40. The optical axis 40A of the imaging optics 40 coincides with an optical axis 30A and/or axis of symmetry of the reflector 30 or is parallel to it or make an angle with it. The interface 60 is designed to put out the signals received from the first inclinometer 20 and the matrix sensor 50 for determining a spatial orientation of the reflector 30 reflecting the measurement beams relative to the target point Z.

Moreover, a position determining system comprising this target and a method which uses this target is disclosed.

25 Claims, 9 Drawing Sheets

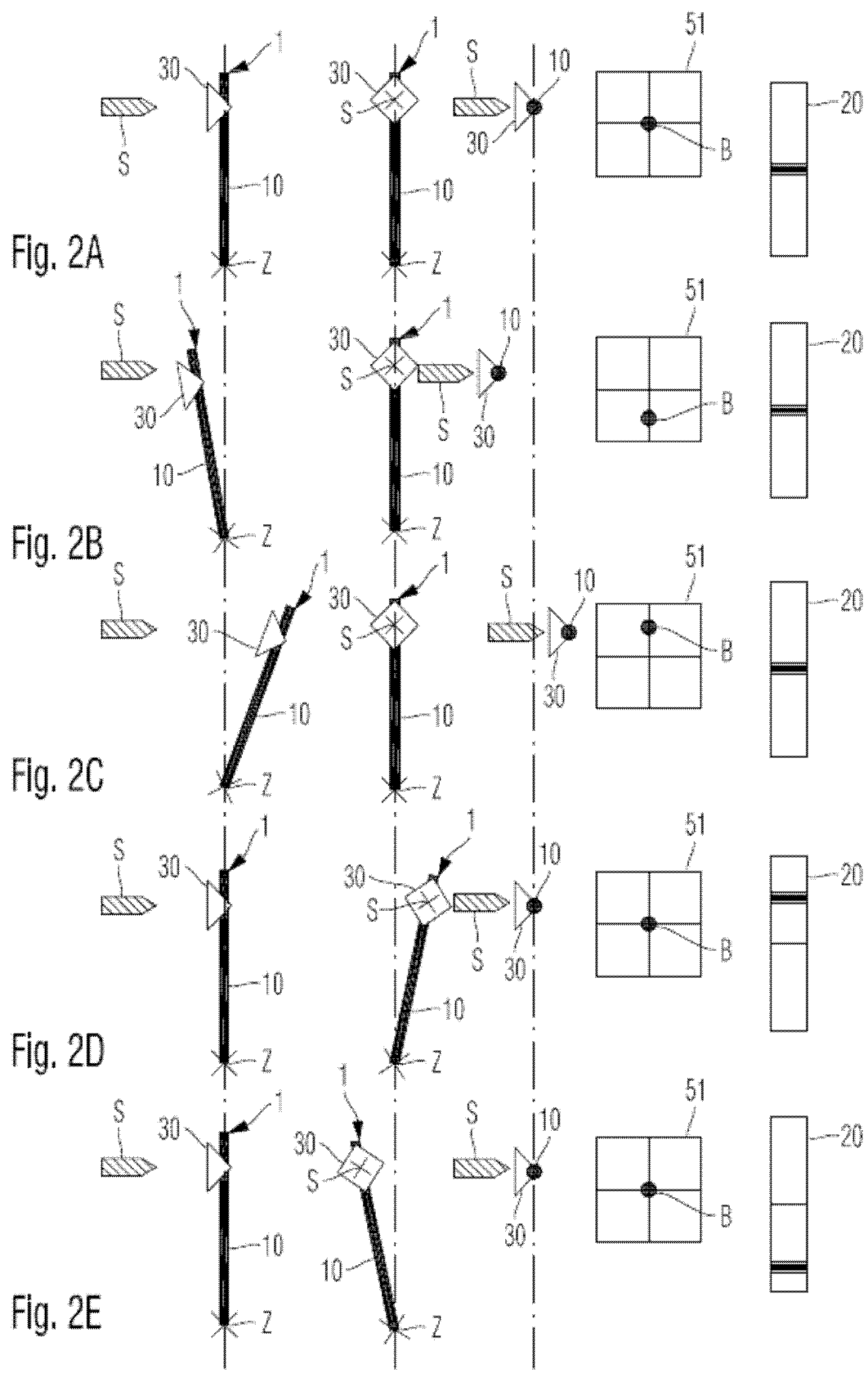

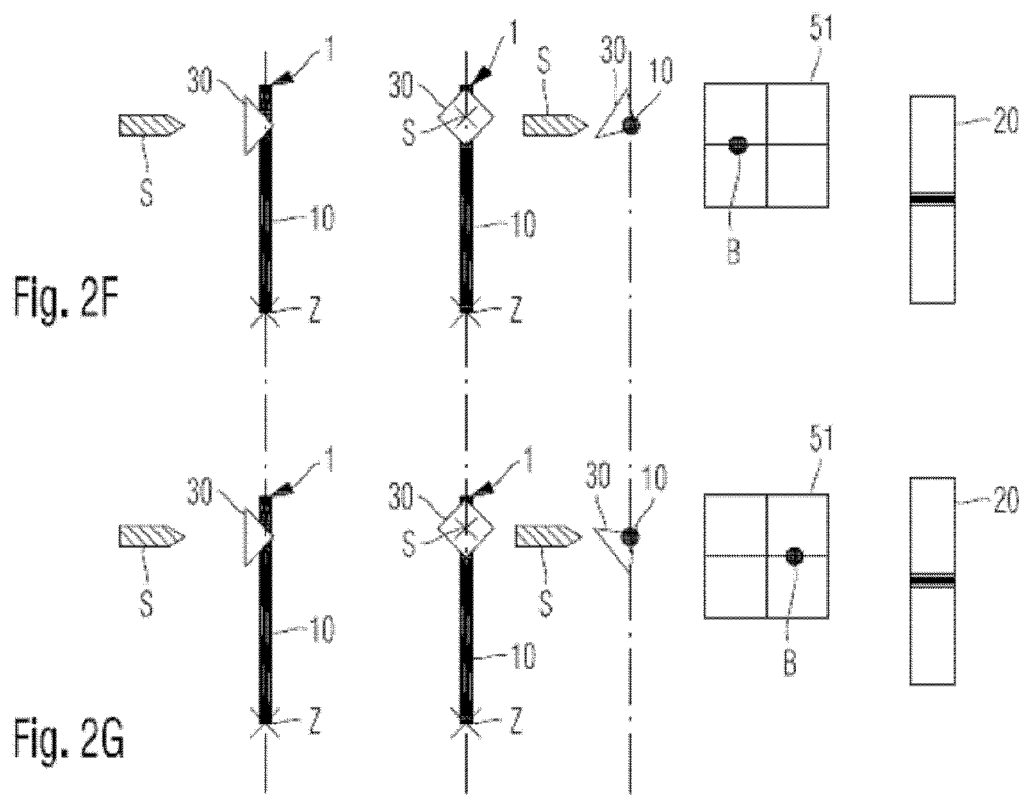
Fig. 2F
Fig. 2G
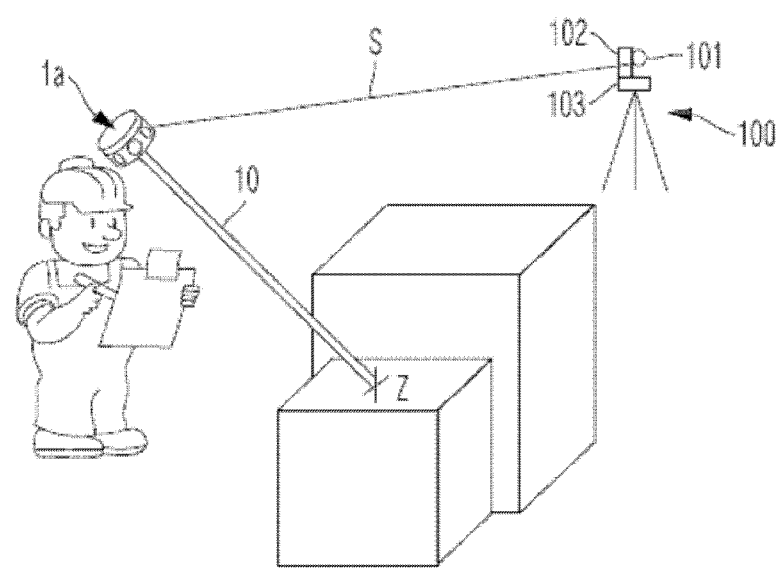
Fig. 4A

GEODETIC TARGET AND POSITION DETERMINATION SYSTEM

CROSS-REFERENCE TO RELATED APPLICATIONS

The present application claims priority to German Patent Application No. DE 10 2012 011 518.0, filed Jun. 8, 2012, the entire contents of which are incorporated herein by reference for all purposes.

One area of tasks of geodesy is determining the position of existing target points and establishing target points at desired positions. The target points can be artificial target points, such as positions on buildings or vehicles. Moreover, the target points can be natural target points, such as landmarks. Target points are often marked, for example, by surveying points.

In many cases, a direct surveying of the target point is not possible, or only possible under unfavorable conditions. For example, the target point may lie outside the measurement range of a geodetic instrument used for the surveying, or its surface texture (and especially its reflectivity) might not be suitable for a direct surveying.

Therefore, a surveying of target points is often done not directly, but indirectly through surveying a geodetic target arranged at the target point, the geodetic target being optimized for such a surveying. The optical target in the most simple case can be a target plate or a reflector. The surveying can then be done by means of a tachymeter, a theodolite, a total station or a leveller, for example.

In the most simple case, the reflector is fastened directly to the target point. But this is often not possible, since there is no line of sight to a geodetic instrument, especially for target points situated on the ground. Furthermore, a reflector fastened to a target point also has a finite dimension and therefore does not coincide fully with the target point.

Therefore, the reflector is often supported by a surveyor's rod, which is arranged above the target point. An exact plumb orientation of the rod is required in this case, for a placement of the geodetic target not vertically above the target point leads to a measurement error. The surveyor's rod has a circular level/bull's eye level for the plumb orientation of the rod. But this cannot detect a turning of the rod with respect to the vertical.

Moreover, a reflector has a direction-invariant point to which a measurement is referred. When the reflector is rotated about this direction-invariant point, the measurement result does not change. This direction-invariant point can coincide with a bearing axis of the surveyor's rod, to which the actual surveying of the target point is referred. If the direction-invariant point does not coincide with the bearing axis of the rod to which the actual surveying of the target point is referred, the measurement result obtained in relation to the reflector must be corrected.

This is explained further by means of FIG. 6.

In FIG. 6, reference number 30' denotes a reflector, 51' the direction-invariant point of the reflector 30' to which measurements are referred, and x, y, z are axes of a local Cartesian system of coordinates of the reflector 30', at whose origin lies the direction-invariant point 51'.

The direction-invariant point 51' of the reflector 30' does not coincide with the target point Z and is therefore also termed eccentric. Instead, the target point Z is shifted relative to the direction-invariant point 51' in the system of coordinates of the reflector 30' by values $\delta x$, $\delta y$, $\delta z$ in the direction of the axes x, y, z. In order to determine the position of the target point Z based on a position of the direction-invariant point 51' of the reflector 30' (measured, for example, by means of a geodetic instrument), it is necessary to determine the values $\delta x$, $\delta y$, $\delta z$ by which the target point is shifted from the direction-invariant point 51'. There are several ways to do this. For example, the values $\delta x$, $\delta y$, $\delta z$ can be mathematically derived by determining the direction of the vector V, which starting at the direction-invariant point 51' is directed at the target point Z, and then determining the distance of the target point Z from the direction-invariant point 51' along this vector V. However, the present invention is not limited to this. The values $\delta x$, $\delta y$, $\delta z$ can also be determined in other ways.

A further area of problems of geodesy is tracking, in which a position of a geodetic target is permanently determined, and the measurement follows a displacement of the geodetic target. Thus, in tracking, the position of the moving geodetic target is determined continually or at very small intervals of time (less than 1 second).

Embodiments of the present invention are addressed to a geodetic target, enabling the determination of the position of existing target points as well as the establishing of target points at desired positions with especially high accuracy.

Further embodiments are addressed to a position determination system comprising this target, as well as a method that uses this target.

Embodiments concern a geodetic target having at least one orienting device with a bearing direction, a first inclinometer (e.g. tilt meter) with a first axis of inclination, at least one reflector reflecting incident measurement beams, at least one imaging optics that focuses the measurement beams incident on the at least one reflector, at least one matrix sensor, whose receiving surface is situated in an image plane of the at least one imaging optics, and an interface, which is connected to the first inclinometer and the matrix sensor. The orienting device is designed to orient the geodetic target along the bearing direction to a target point. Thus, the bearing direction is a vector whose direction in relation to a direction-invariant point of the geodetic target to which direction-invariant point measurements are referred is known by calibration. The first inclinometer is designed to determine at least one inclination of the geodetic target to the vertical. The focusing imaging optics is coordinated with the at least one reflector and designed to focus the measurement beams incident on the respective reflector in an image point. The matrix sensor is designed to determine a position of the image point within the receiving surface. The spatial arrangement and orientation of an optical axis and/or axis of symmetry of the at least one reflector relative to the bearing direction of the at least one orienting device is predetermined and thus known. This dependency can be dictated by the geometry of the geodetic target. The first axis of inclination makes an angle other than zero with an optical axis of the at least one imaging optics. In other words, the axis of inclination is not oriented parallel to or coaxial with the optical axis of the at least one imaging optics. However, this does not preclude, when several inclinometers and several imaging optics are present in the optical target, also being able to identify inclinometers and imaging optics whose axes of inclination and optical axis are situated coaxially or parallel. Instead, it is enough for there to be at least one inclinometer for each imaging optics whose axis of inclination makes an angle other than zero with the optical axis of the imaging optics. The optical axis of the at least one imaging optics can coincide with an optical axis and/or axis of symmetry of the corresponding at least one reflector or be parallel to it or make an angle with it. This angle between the optical axis of the at least one imaging optics and the optical axis and/or axis of symmetry of the corresponding at least one reflector can be, for example, an angle less than 5° and moreover in particular an angle of 0°. In other words, the reflector and the corresponding imaging optics are oriented so that they receive the incident measurement beams at the same time. The interface is designed to put out the signals received from the first inclinometer and the at least one matrix sensor for determining a spatial orientation of the reflector reflecting the measurement beams relative to the target point. This can include a processing (e.g., correction) and/or encrypting and/or compression of the signals by the interface. In particular, the interface can be designed to determine and put out the spatial orientation of the reflector reflecting the measurement beams relative to the target point by means of the signals received from the first inclinometer and the matrix sensor.

By using the reflector, it is possible for a geodetic instrument to determine the spatial position of the reflector reflecting the measurement beams and thus the position of the geodetic target, for example, by a distance measurement and two angle measurements. With the position of the image point within the receiving surface of the matrix sensor, it is possible to determine a possible rotation of the reflector reflecting the measurement beams and, thus of the geodetic target about axes lying in the same plane and making an angle different from zero with the optical axis of the imaging optics. With the inclinometer, it is possible to determine a possible rotation of the geodetic target about the optical axis of the imaging optics. In this way, one can determine the orientation of the reflector reflecting the measurement beams and, with this, that of the geodetic target relative to the target point. This enables a correction of errors in the surveying of a target point situated in the bearing direction of the orienting device. If, in addition, the distance between the reflector reflecting the measurement beams and the target point along the bearing direction of the orienting device is known, an exact determination of the position of the target point relative to the reflector of the geodetic target is possible. The determination of the position of the target point relative to the reflector of the geodetic target is then done by means of a vector directed at the target point, whose direction corresponds to the bearing direction, which is known by calibration of the orienting device, in combination with a distance measurement along the vector and, thus, the bearing direction.

The measurement beam focused in the image point by the at least one imaging optics can be the same measurement beam used to perform a measurement (such as a distance measurement) in relation to the at least one reflector.

However, the present invention is not limited to this. The measurement beam focused in the image point by the at least one imaging optics can also be provided in addition to the measurement beam used to perform a measurement in relation to the at least one reflector. For example, laser beams with different wavelengths can be used for the focusing in the image point and the performance of the measurement in regard to the reflector. If different measurement beams are used, the directions of propagation of the beams coincide according to one embodiment, or the directions of propagation of the beams are oriented parallel to each other. According to an alternative embodiment in which different measurement beams are used, the directions of propagation of the beams make with each other an angle of one or the directions of propagation of the beams are skewed relative to each other, each angle subtended between the directions of propagation being less than 5° and preferably less than 2° and especially preferably less than 1°.

The measurement beam used in regard to the at least one reflector can be, for example, a laser beam emitted by a geodetic instrument, EDM (electronic distance measurement) beams, or tracking beams.

According to one embodiment, the focusing imaging optics is adjusted to infinity. The image plane then lies at the focus of the focusing imaging optics.

According to one embodiment the first inclinometer is designed for the simultaneous determining of more than one and in particular two inclinations of the geodetic target to the vertical about more than one and in particular two axes of inclination. If the first inclinometer is designed for simultaneous determination of two inclinations of the geodetic target, the axes of inclination according to one embodiment are oriented orthogonally to each other.

According to one embodiment, at least one orienting device of the geodetic target is at least one of a range finder and especially a laser range finder to take the bearing of the target point and measure the distance between the reflector of the geodetic target reflecting the measurement beams and the target point by means of a measurement beam and especially a laser beam, a laser projector for marking a target point, a camera, especially a digital camera, and a display, especially a video projector, for marking a target point. Furthermore, the interface is connected to the at least one orienting device and designed to put out the signals received from the first inclinometer, the at least one matrix sensor and the at least one orienting device to determine a spatial position and orientation of the reflector reflecting the measurement beams relative to the target point. In such an orienting device, therefore, the distance between the reflector of the geodetic target reflecting the measurement beams and the target point is not constantly predetermined, but rather needs to be determined specifically for each measurement. The bearing of the target point in relation to the reflector reflecting the measurement beams is known thanks to the bearing direction of the orienting device. For example, the bearing direction can be established by an optics of the orienting device and determined by calibration of the orienting device.

According to one embodiment, at least one orienting device of the geodetic target is at least one of a survey rod, a ranging rod, a rover rod, a tool, especially a drill, and a spacer. Furthermore, the interface is designed to put out the signals received by the first inclinometer and the at least one matrix sensor, as well as the arrangement and dimensioning of the at least one orienting device to determine a spatial position and orientation of the reflector of the geodetic target reflecting the measurement beams relative to the target point. In such an orienting device, a distance between the geodetic target and the target point is predetermined by the geometry and therefore need not be determined once again for each measurement. The bearing of the target point in relation to the geodetic target is known thanks to the bearing direction which is given by the geometry of the layout and furthermore it can be determined by calibrating the orienting device.

According to one embodiment, in a geodetic target with more than one orienting device the bearing directions of the orienting devices are coaxial or parallel. According to an alternative embodiment, in a geodetic target with more than one orienting device the bearing directions of the orienting devices are skewed or lie in mutually orthogonal planes.

According to one embodiment, the geodetic target comprises at least two reflectors with corresponding imaging optics as well as a mirror arrangement, wherein the mirror arrangement is situated along the optical axes of the imaging optics between the imaging optics and the at least one matrix sensor. If the geodetic target has more than one matrix sensor, several mirror arrangements can also be provided. By the use of the mirror arrangement, it is possible to fold the beam path of the measurement beam focused by the at least one imaging optics and thus reduce the size of the geodetic target. Furthermore, when a mirror arrangement is used, several imaging optics can use the same matrix sensor.

According to one embodiment, the mirror arrangement is a convexly curved mirror surface common to several imaging optics and especially a spherical-section mirror surface or a conical mirror surface or a truncated conical mirror surface or a pyramidal mirror surface or a frustum-shaped mirror surface.

According to one embodiment, the geodetic target has at least four reflectors, especially at least six reflectors, and moreover especially at least eight reflectors with corresponding imaging optics, which are arranged on the geodetic target distributed across 360° with identical angular intervals. This allows one to use the geodetic target without having to orient the reflectors with the corresponding imaging optics to a geodetic instrument being used. Furthermore, an automatic tracking of the geodetic target by a geodetic instrument is also possible in this way, without needing to adjust the orientation of reflectors of the geodetic target.

According to one embodiment, the geodetic target furthermore comprises a filter arranged between the receiving surface of the at least one matrix sensor and the corresponding imaging optics or between the receiving surface of the at least one matrix sensor and the corresponding reflector, especially a band pass filter having a high transmissivity for incident measurement beams. In this way, stray radiation can be masked out.

According to one embodiment, a focal length of the imaging optics is adjusted to a visual field of the corresponding reflector.

According to one embodiment, the geodetic target furthermore comprises a second inclinometer (e.g. tilt meter) with a second axis of inclination, wherein the first axis of inclination of the first inclinometer and the second axis of inclination of the second inclinometer make an angle different from zero and especially an angle of 90° to determine two inclinations of the geodetic target with respect to the vertical in different directions. The use of two inclinometers with mutually orthogonal axes of inclination can bring advantages when several reflectors with corresponding imaging optics are distributed across 360° on the geodetic target. More than two inclinometers can also be provided.

According to one embodiment, the geodetic target has three inclinometers with mutually orthogonal axes of inclination, and a plurality of reflectors and corresponding imaging optics are arranged on the geodetic target, uniformly distributed over a sphere or spherical shell. This enables a measurement from any given direction in relation to the geodetic target.

According to one embodiment, the geodetic target further comprises a control system, wherein the control system receives the signals put out by the interface and uses these signals to determine the relative position of the target point to the reflector of the geodetic target reflecting the measurement beams.

According to one embodiment, the control system is further designed to put out the relative position determined for the target point via an air interface and/or indicate it on a display.

According to one embodiment, the optical axis of the at least one imaging optics coincides with an axis of symmetry of the reflector. This ensures that measurement beams incident on the reflector are also detected by the corresponding imaging optics.

According to one embodiment, the imaging optics is integrated centrally in the at least one reflector. If the reflector is a triple prism or a triple mirror, the vertices of the prism or mirror can be removed and the imaging optics arranged there.

According to one embodiment, the at least one imaging optics is an optical lens, where the term "lens" also encompasses cemented elements and/or lens groups.

According to one embodiment, the at least one matrix sensor is a position-resolving CCD sensor or CMOS sensor.

According to one embodiment, the interface is an air interface (such as Bluetooth, WLAN, infrared or radio) and/or a man/machine interface (such as a display or a loudspeaker).

Embodiments of a position determining system for geodesy comprise a geodetic target as described above and a geodetic instrument. The geodetic instrument comprises a measurement device determining the spatial position of the reflector of the geodetic target reflecting the measurement beams relative to the geodetic instrument and a control system. The control system is designed to receive signals put out by the interface of the geodetic target and to use these signals, as well as the spatial position determined by the measurement device of the reflector of the geodetic target reflecting the measurement beams relative to the geodetic instrument to determine the relative position of the target point to the geodetic instrument. For the receiving of the signals put out by the interface of the geodetic target, the geodetic instrument itself can have a corresponding interface (such as Bluetooth, WLAN, infrared or radio). Moreover, the geodetic instrument can have a man/machine interface (such as a display or a loudspeaker) for putting out the position determined for the target point relative to the geodetic instrument.

According to one embodiment, the geodetic instrument furthermore comprises a location determining device that determines the absolute position of the geodetic instrument. The location determining device can use, for example, a global navigation satellite system, such as GPS or Galileo. Alternatively or additionally, the location determining device can be designed to perform a relative measurement to known target points in order to determine the absolute position of the geodetic instrument. In this case, the location determining device can be realized by the measurement device of the geodetic instrument. The control system of the geodetic instrument can furthermore be designed to receive signals put out by the interface of the geodetic target and to use these signals as well as the spatial position determined by the measurement device for the reflector of the geodetic target reflecting the measurement beams relative to the geodetic instrument and the absolute position of the geodetic instrument as determined by the location determining device to determine the absolute position of the target point.

According to one embodiment, the measurement in regard to the geodetic target is done continuously by the geodetic instrument. For this, the geodetic instrument can have, for example, a continuous wave laser. This makes possible a tracking of the geodetic target, so that the position of the possibly moving geodetic target is determined continuously or in very short intervals of time (less than 1 second).

According to one embodiment, the measurement in regard to the geodetic target by the geodetic instrument is pulsed. For this, the geodetic instrument can have a pulsed laser, for example. The control system of the geodetic instrument can then furthermore be designed to put out to the geodetic target a synchronization signal synchronized with the emission of the measurement beams. In this way, the determination of the position of the image point within the receiving surface of the matrix sensor can be synchronized with the emission of the measurement beams, so that the position can be determined making use of difference images. This can bring advantages, for example, in the presence of strong spurious radiation.

According to one embodiment, the geodetic instrument is a tachymeter or leveller or a laser tracker.

According to one embodiment, the control system of the geodetic instrument and the interface of the geodetic target are designed to synchronize the determination of the spatial position of the reflector reflecting the measurement beams relative to the geodetic instrument by the measurement device of the geodetic instrument with the putting out of signals received from the first inclinometer and the matrix sensor of the geodetic target by the interface of the geodetic target to determine a spatial orientation of the reflector reflecting the measurement beams relative to a target point lying in the bearing direction. This can be done, for example, by using a highly precise time signal in the geodetic instrument. Alternatively, this synchronization can also occur autonomously by the geodetic target coordinating time stamps with the signals put out.

Embodiments of a method for establishing target points by using the aforementioned position determining system have the following steps:

orienting a bearing direction of the geodetic target to a target point;

determining the spatial position and orientation of a reflector of the geodetic target reflecting the measurement beams relative to the geodetic instrument;

determining the spatial position of the target point relative to the reflector of the geodetic target reflecting the measurement beams; and determining the spatial position of the target point relative to the geodetic instrument.

According to one embodiment, the method further involves marking the target point by means of at least one of a laser beam, a video projection and an indication of a display by the geodetic target.

According to one embodiment, the above-described geodetic target can be mounted on the helmet of a user and can use the so determined position and orientation of the geodetic target to display an image, true to the position of a target point, in a head-mounted-display of a user wearing the helmet.

According to one embodiment, the above-described geodetic target can be integrated in a projector or a machine tool.

In this context, it is pointed out that the terms used in this specification and the claims for the enumeration of features: "comprise", "have", "contain", and "with", as well as their grammatical mutations, are to be understood generally as a nonexclusive enumeration of features, such as method steps, devices, ranges, quantities and the like, and in no way exclude the presence of other or additional features or groupings of other or additional features.

Additional features of the invention will emerge from the following description of sample embodiments in connection with the claims as well as the figures. In the figures, the same or similar elements are designated with the same or similar reference numbers. It is pointed out that the invention is not confined to the embodiments of the described sample embodiments, but rather it is determined by the scope of the enclosed patent claims. In particular, the individual features in embodiments of the invention can be implemented in different numbers and combinations than those of the examples given hereafter. In the following explanation of a sample embodiment of the invention reference shall be made to the enclosed figures, of which FIG. 1 shows, schematically in frontal view, a cross section through a geodetic target according to a first embodiment;

FIGS. 2A to 2G show schematically different orientations of the geodetic target of FIG. 1 and measurement values resulting from the orientations for an inclination sensor of the geodetic target as well as positions resulting from the orientations for an image point within a receiving surface of a matrix sensor of the geodetic target;

FIGS. 4A to 4K show schematically position determining systems and their use according to several embodiments;

FIG. 1 is a partially cutaway front view.

Figure 1:
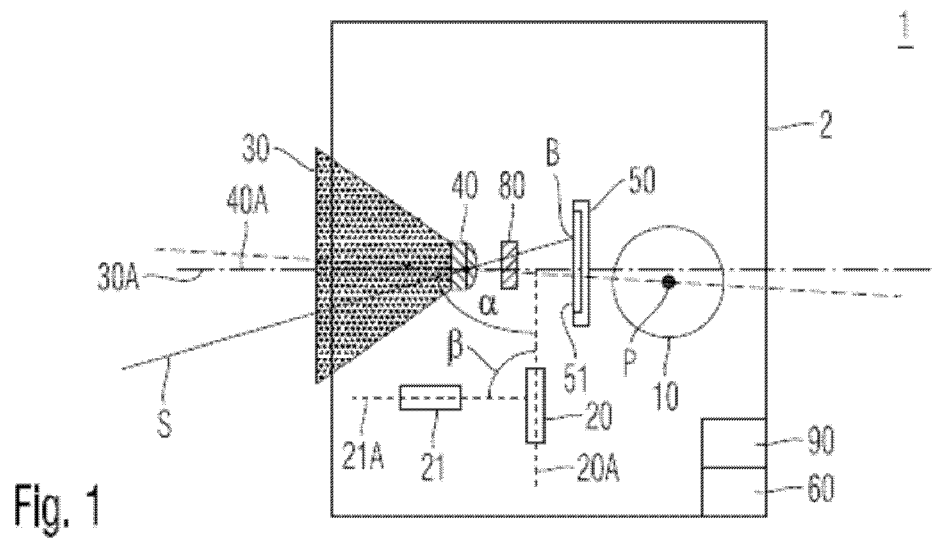
FIG. 1 shows schematically the make-up of a geodetic target according to a first embodiment.

The geodetic target 1 shown in FIG. 1 has a housing 2 secured to a survey rod 10. The dimension of the survey rod 10 in the lengthwise direction establishes a bearing direction P. At its lower end (not shown), the survey rod 10 has a tip, which coincides with the bearing direction P and can be placed on a target point Z. The housing 2 accommodates on its inside a first inclination sensor 20 with a first axis of inclination 20A and a second inclination sensor 21 with a second axis of inclination 21A. The axes of inclination of the first and second inclination sensors 20, 21 make an angle $\beta$ of 90° and allow a determining of the inclination of the housing 2 with respect to the vertical. One side wall of the housing 2 has a triple prism 30 serving as a reflector passing through it, which reflects back incident measurement beams S. The geometry of the triple prism 30 establishes an axis of symmetry 30A, which coincides with the optical axis of the triple prism 30. In the embodiment shown, the axis of symmetry 30A of the triple prism 30 lies in a plane that is orthogonal to the bearing direction P of the survey rod 10. However, the axis of symmetry 30A does not intersect the bearing direction P in the embodiment shown, and the deviation from the geometry of the geodetic target is known. Alternatively, however, it is also possible for the axis of symmetry 30A to intersect the bearing direction P. The triple prism 30 reflects incident measurement beams S precisely in the direction from which they arrive. The vertex of the triple prism 30 is cut off and replaced by a lens 40, which focuses the incident measurement beams S in an image point B in an image plane. In the image plane is arranged a receiving surface 51 of a CCD sensor 50. The position of the image point B on the receiving surface 51 of the CCD sensor 50 therefore depends on the angle by which the measurement beams S are incident on the lens 40 and thus the triple prism 30. Between the receiving surface 51 of the CCD sensor 50 and the lens 40 in the embodiment shown is arranged a filter 80, which only lets through radiation of the wavelength region in which the measurement beams S lie. Thus, filter 80 is a band pass filter attuned to the measurement beams S. In the embodiment shown, one optical axis 40A of the lens 40 coincides with the axis of symmetry 30A of the triple prism 30. But this is not absolutely necessary. As can be seen, the first axis of inclination 20A of the first inclination sensor 20 is arranged in a plane which makes an angle $\alpha$ of 90° with the axis of symmetry 30A of the triple prism and the optical axis 40A of the lens 40. Accordingly, the second axis of inclination 21A of the second inclination sensor 21 lies in a plane situated parallel to the axis of symmetry 30A of the triple prism 30 and the optical axis 40A of the lens 40. However, the present invention is not limited to such an arrangement of the inclination sensors or to the presence of two inclination sensors. It is sufficient for one inclination sensor to be present, making an angle other than zero with the optical axis of the lens 40 and thus with the imaging optics used.

Moreover, it is not required that the imaging optics be formed by a lens 40 put in place of the cut-off vertex of a triple prism or triple mirror. Alternatively, the imaging optics can also be arranged next to the reflector on the housing wall. Moreover, the imaging optics can also have several lenses.

The housing furthermore accommodates a control system 90 and an interface 60, which are connected to the first and second inclinometers 20, 21 and the CCD sensor 50.

In the embodiment shown, it is known in advance, thanks to the geometry, how great the distance is between the tip of the survey rod 10 and the plane in which the axis of symmetry 30A of the triple prism 30 lies. Moreover, the distance of the direction-invariant point of the triple prism 30 from the bearing direction P is known in advance.

It is therefore possible for the control system 90 with the survey rod 10 placed on the target point Z to use the signals put out by the interface to calculate the spatial position and orientation of the triple prism 30 relative to the target point Z and optionally put it out via an air interface of the interface 60. In addition or alternatively, the interface 60 can have a display (not shown) to put out the so determined position and orientation of the triple prism 30 with respect to the target point Z.

In what follows, making reference to FIGS. 2A to 2G, we shall describe the mode of operation of the target 1 shown in FIG. 1.

FIGS. 2A to 2G show schematically different positions and orientations of the geodetic target with respect to the target point Z. The individual figures each time show three different views of the same geodetic target 1. Starting from the left, FIG. 2A to 2G each show at first a side view of a geodetic target 1 placed on the target point Z, then a front view and finally a top view of the same geodetic target 1. The position of the target point which is common to all figures is represented by vertical broken lines which connect all figures. At the far right of the figures is shown schematically a view of the first inclinometer 20 of the geodetic target 1, where the measured inclination is symbolized by a black bar. A center position of the bar means no inclination in the direction of the first axis of inclination 20A. Moreover, in the second position at the right of the figures is shown a view of the receiving surface 51 of the CCD sensor 50, also representing the position of the image point B where the lens 40 projects incident measurement beams S. To help with understanding, the receiving surface 51 is provided with a cross, dividing the receiving surface 51 into four equal parts and marking a center point. In reality, this cross is not present.

FIG. 2A shows a geodetic target 1 perfectly oriented at the target point Z. The survey rod 10 is oriented absolutely vertical to the target point Z and the axis of symmetry 30A of the triple prism 30 is oriented exactly to incident measurement beams S. In such a case, the image point B lies precisely in the center of the receiving surface 51 of the CCD sensor 50 and the first inclinometer 20 detects no inclination in the direction of the first axis of inclination 20A. In this context, it is stressed that the reference position of the image point B need not necessarily be the center point of the receiving surface 51. Instead, another site, determined by calibration for example, can be determined as the reference position.

In FIGS. 2B and 2C, the triple prism 30 is tilted relative to the target point Z in the direction of the incident measurement beams S. Since this tilting runs perpendicular to the first axis of inclination 20A of the first inclination sensor 20, it cannot be detected by the first inclination sensor 20. The image point of the incident measurement beam, however, wanders downward or upward on the receiving surface 51 of the CCD sensor 50 relative to the center (reference position).

In FIGS. 2D and 2E, the triple prism 30 is swiveled relative to the target point Z within a plane that is oriented perpendicular to the incident measurement beam S. In this case, the inclination of the survey rod 10 is detected by the first inclination sensor 20. However, the image point is situated at the center (reference position) of the receiving surface 51 of the CCD sensor 50.

In FIGS. 2F and 2G, the survey rod 40 of the geodetic target 1 is oriented vertically above the target point Z, but the triple prism 30 with the lens 40 is rotated so that the incident measurement beam S makes an angle other than zero with the axis of symmetry 30A of the triple prism 30. This cannot be detected by the first inclination sensor 20. However, the image point B wanders to the left or right on the receiving surface 51 of the CCD sensor.

The above described tilts and rotations of the geodetic target 1 can also occur in combination.

Thus it is possible, with the geodetic target shown in FIG. 1, to detect any deviation in the orientation and position of the geodetic target relative to the target point Z by means of the first inclination sensor 20 and the position of the image point B on the receiving surface 51 of the CCD sensor 50.

Figure 3A:
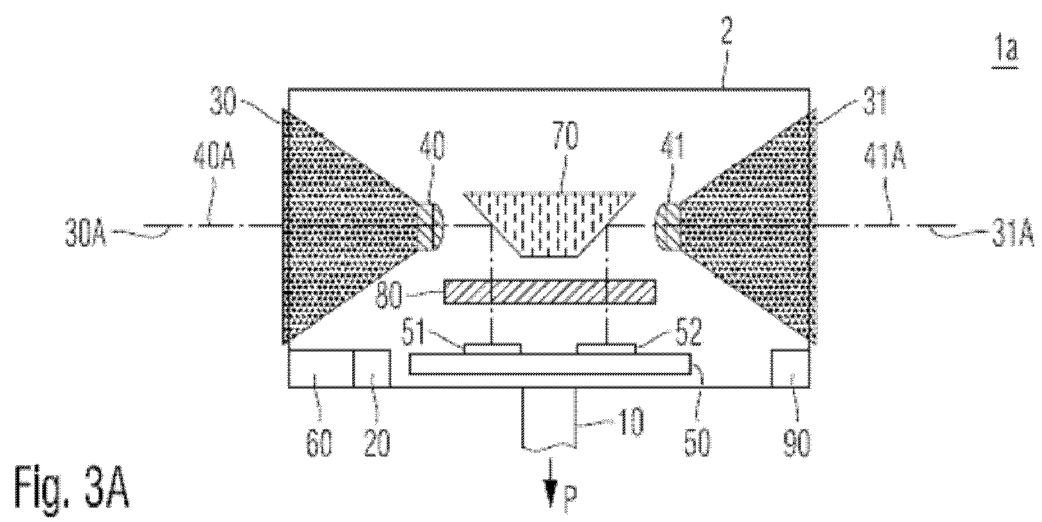
FIGS. 3A and 3B show, schematically in side view, cross sections through geodetic targets according to a second and third embodiment.
Figure 3B:
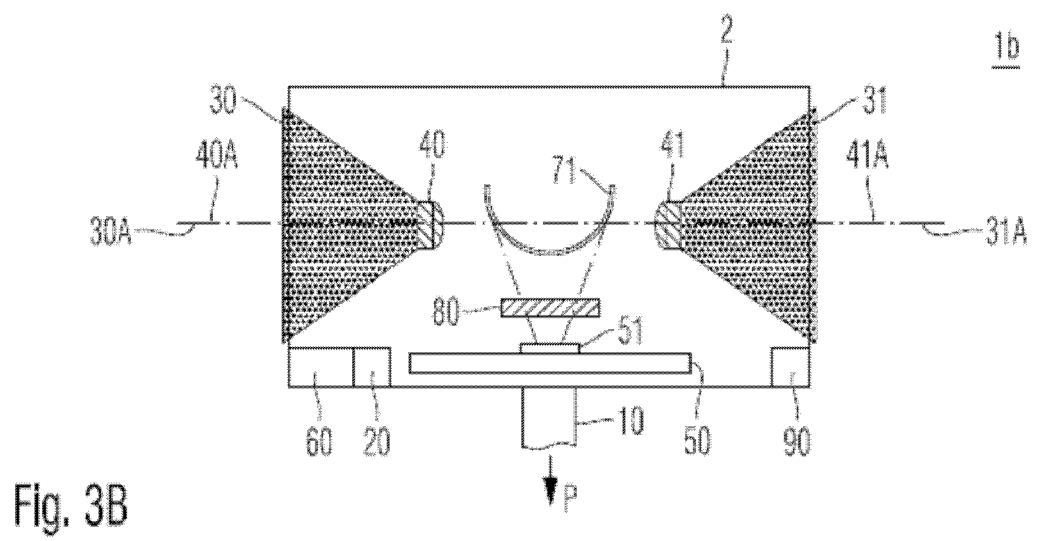

FIGS. 3A and 3B show schematically cross sections through geodetic targets according to a second and a third embodiment in side view. Here, each time the survey rod 10 establishing the bearing direction P of the geodetic target is not shown in full.

The second and third embodiment are based on the above-described first embodiment, so that only differences shall be discussed more closely below.

According to the second embodiment shown in FIG. 3A, the housing 2 of the geodetic target 1B has eight triple prisms 30, 31 passing through it, but only two of them are shown. These eight triple prisms 30, 31 are arranged such that they form opposite pairs and the optical axes 30A, 31A of neighboring triple prisms 30, 31 make an angle of 45° with each other. Thus, the eight triple prisms 30, 31 are distributed uniformly over 360°. In this way, it is possible by means of the geodetic target shown in FIG. 3A to detect measurement beams S impinging on the geodetic target 1a from different sides, so that for the most part one need not orient the triple prisms 30, 31 to the incident measurement beams. At the point of intersection of the axes of symmetry 30A, 31A of the triple prisms 30, 31 is arranged a truncated conical mirror 70. The mirror 70 deflects measurement beams S impinging on the triple prisms 30, 31 and focused by the lenses 40 and 41 downward to two receiving surfaces 51 and 52 of a matrix sensor 50. In this process, the measurement beams S pass through a common filter 80.

The third embodiment shown in FIG. 3B has two triple mirrors 30, 31, passing through the wall of the housing 2 in opposite directions. The triple mirrors Spiegel 30 and 31 are arranged so that their axes of symmetry 30A and 31A coincide. The vertex of the triple mirrors 30 and 31 is removed each time and in its place is disposed a cemented lens element 40 and 41. Between the cemented lens elements 40 and 41 is disposed a mirror 71 in the shape of a half-sphere. In this way, it is possible by means of the geodetic target 1B shown in FIG. 3B to receive measurement beams S impinging from opposite directions. Thanks to the mirror 71, measurement beams impinging on the triple mirrors 30 and 31 and focused by the corresponding cemented lens elements 40 and 41 are directed onto a receiving surface 51 of a matrix sensor 50 common to all triple mirrors 30, 31. In this process, once again the measurement beam passes through a filter 80. However, it is stressed that the providing of a filter is only optional.

In what follows, reference shall be made to FIG. 4A to 4K to describe different embodiments of position determination systems and their possible uses.

The position determination system shown in FIG. 4A has a tachymeter 100, in addition to the geodetic target 1a familiar from FIG. 3A. But in place of a tachymeter it is also possible to use another geodetic instrument. By sending out measurement beams S, a measurement device 101 of the tachymeter 100 detects the spatial position of one of the triple prisms 30, 31 of the geodetic target 1a relative to the tachymeter 100. Furthermore, a control system 102 of the tachymeter receives signals put out by the interface 60 of the geodetic target 1a. By means of these signals, as well as the spatial position of the triple prism 30, 31 relative to the tachymeter 100 as determined by the measurement device 101, the control system 102 determines a relative position of the target point Z to the tachymeter 100. This position is put out by the tachymeter 100 via a display (not shown) to the user. In addition, the tachymeter shown in FIG. 4A has a GPS system 103, which determines the absolute position of the tachymeter 100. In this way, the control system 102 can also determine and put out the absolute position of the target point Z.

Figure 4B:
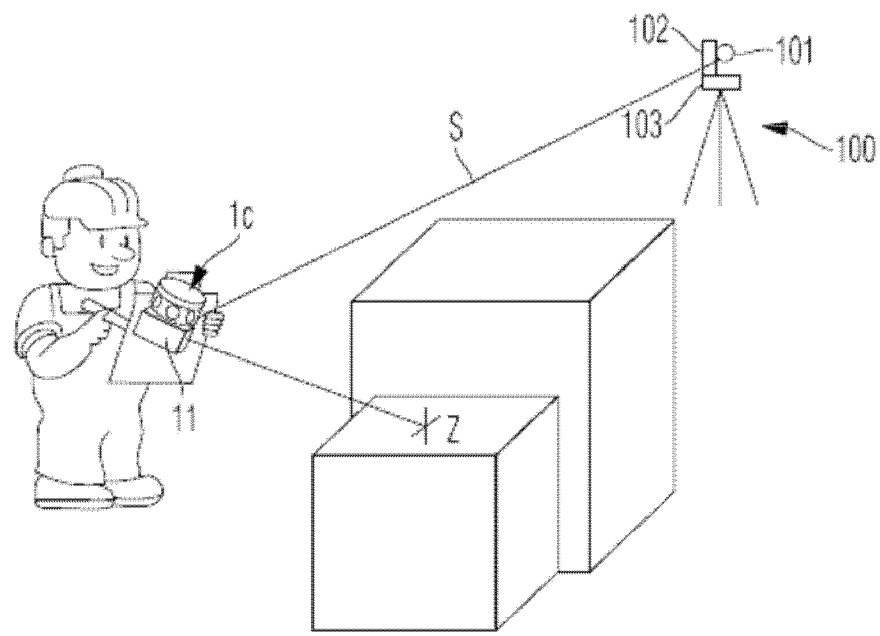

The position determination system shown in FIG. 4B differs from the position determination system shown in FIG. 4A especially in that the geodetic target 1c has no survey rod 10. Instead, the geodetic target 1c has a laser range finder 11, which establishes the bearing direction P of the geodetic target 1c. By means of this laser range finder 11, one can take the bearing of the target point Z and determine a distance between the geodetic target 1c and the target point Z. Thanks to the arrangement of the image point B on the receiving surface of the matrix sensor, as put out by the interface of the geodetic target 1c to the tachymeter 100, and the measured value of the first inclination sensor, it is possible for the tachymeter 100 to determine an orientation of the geodetic target 1c relative to the target point. Furthermore, the tachymeter 100 determines by means of the measurement device 101 the relative position of back-reflectors of the geodetic target 1c. In this way, the control system 102 determines the relative position of the target point Z with respect to the tachymeter 100.

Figure 4C:
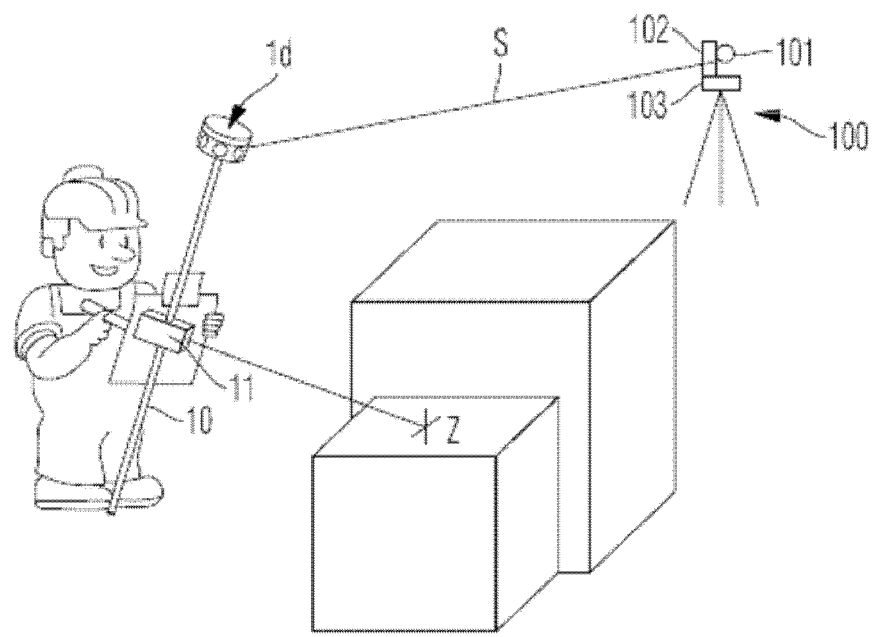

The position determination system of FIG. 4C differs from the position determination system of FIGS. 4A and 4B especially in that the geodetic target 1d has both a range finder 11 and a survey rod 10. The geodetic target 1d can thus optionally use mutually orthogonal bearing directions for the measurement.

Figure 4D:
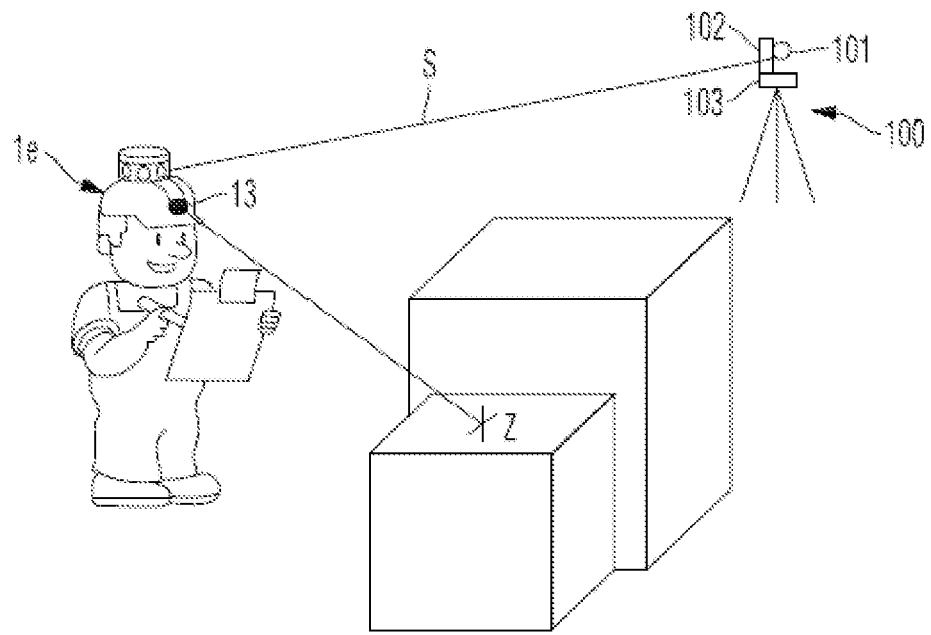

The position determination system shown in FIG. 4D differs from the position determination system known from FIG. 4B especially in that the geodetic target 1e is integrated in a helmet of the user.

Figure 4E:
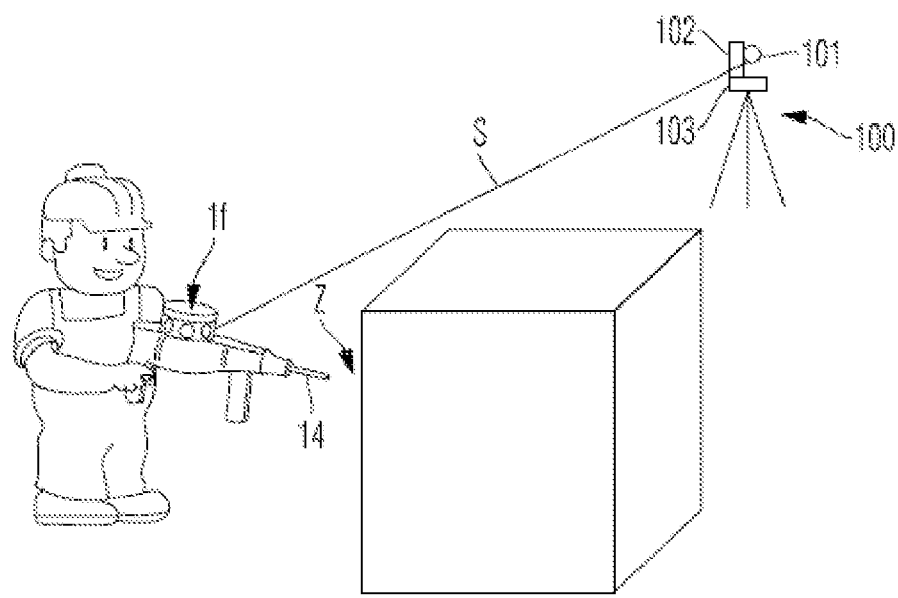

The position determination system shown in FIG. 4E differs from the position determination system shown in FIG. 4A especially in that the survey rod 10 is replaced by the work spindle of a machine tool, more particularly, the drill of a drilling machine. Thus, the drill 14 of the drilling machine serves to establish the bearing direction P of the geodetic target if as well as to determine the distance from the target point Z. Therefore, in this layout as well, a relative determination of the position of the target point Z with respect to the tachymeter 100 is possible.

Figure 4F:
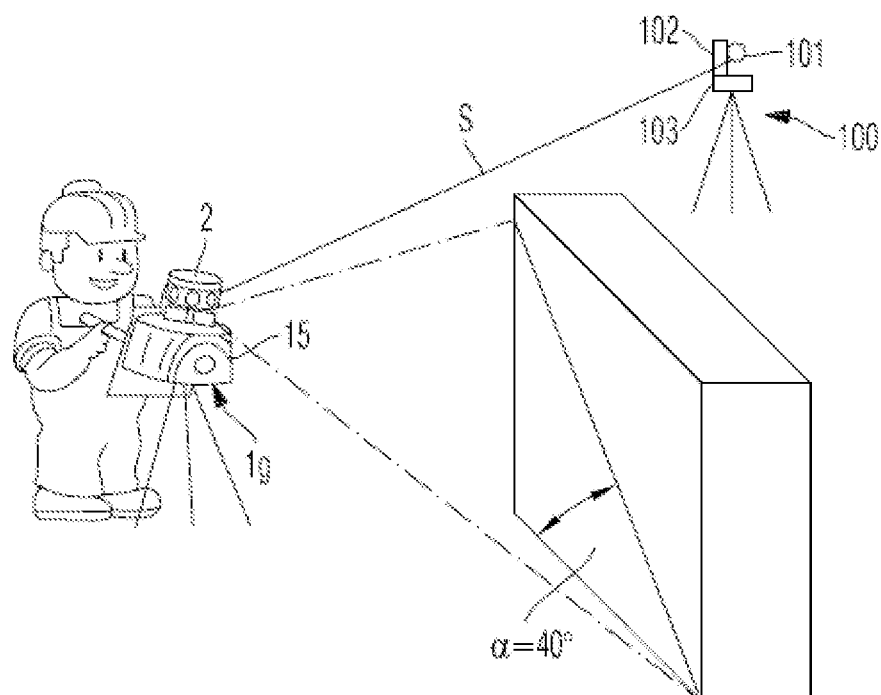

The position determination system shown in FIG. 4F differs from the position determination system shown in FIG. 4B especially in that a rotation laser 15 is used instead of a laser range finder. The distance of the rotation laser 15 from a target plane can be determined separately in this case, or specified in advance.

Figure 4G:
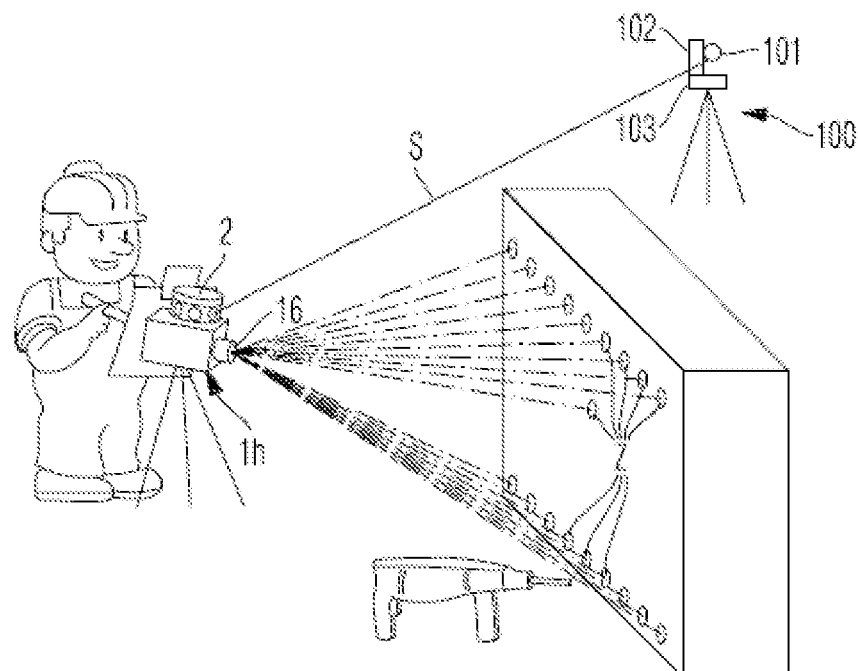

The position determination system shown in FIG. 4G differs from the position determination system known from FIG. 4F especially in that a laser projector 16 with integrated distance meter is used in place of the rotation laser 15. In this way, complex bored holes can be established, for example. This is done by a marking of target points Z.

Figure 4H:
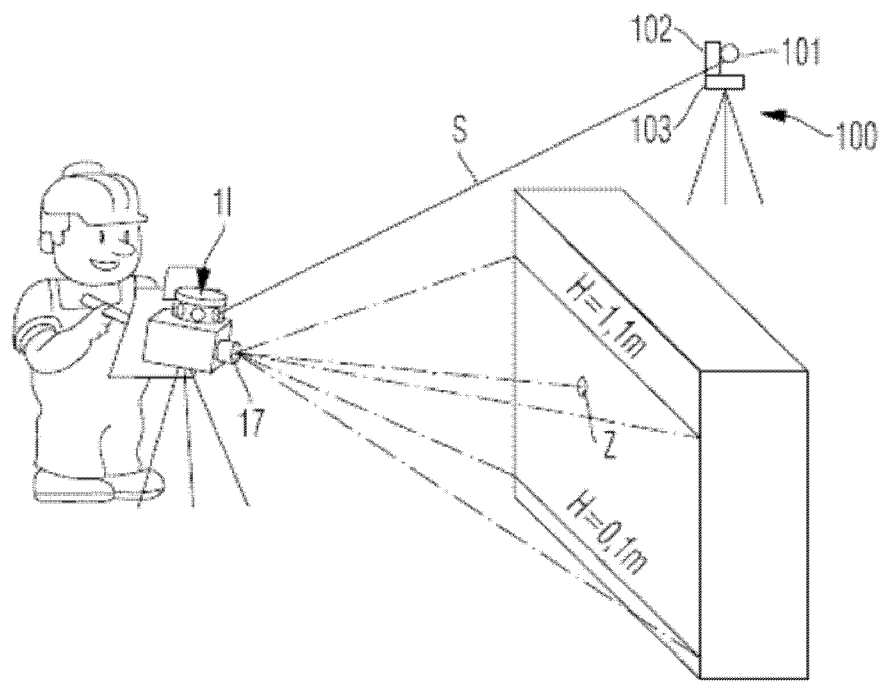

The position determination system shown in FIG. 4H differs from the position determination system shown in FIG. 4G especially in that lines can also be established in a target plane in addition to individual points by means of a laser projector 17.

Figure 4I:
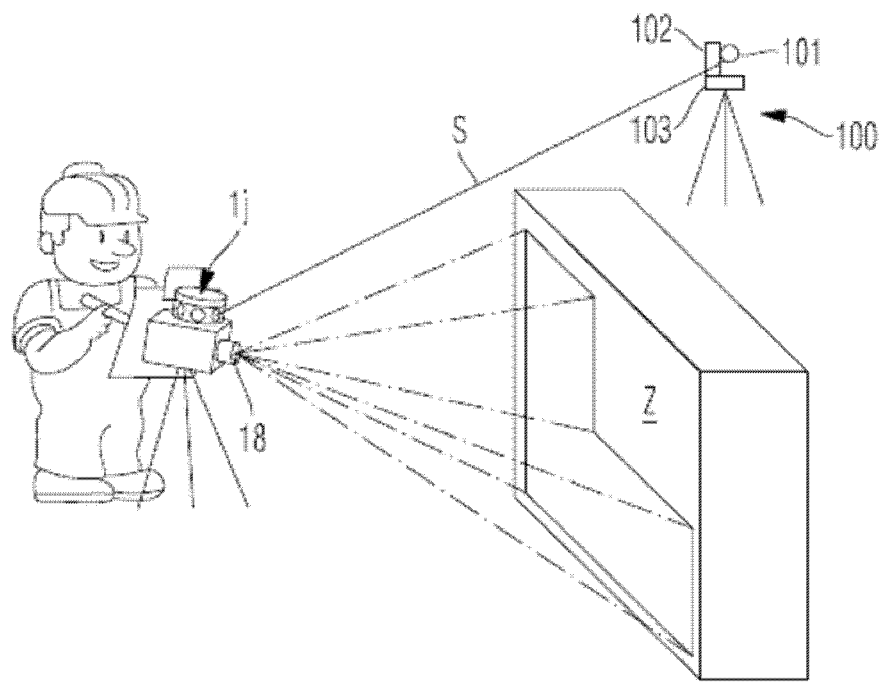

The position determination system shown in FIG. 4I differs from the position determination system shown in FIG. 4F especially in that the rotation laser is replaced by a video projector 18. If in addition the distance between the video projector 18 and a target plane Z is determined separately or given in advance, one can then incorporate CAD data, for example, true to position.

In the embodiments depicted in FIG. 4F to 4I, it is of benefit to have in hand a CAD model of the object being viewed (for example, the wall on which a projection is being done). With the help of this CAD model, the target points Z can then be marked, lines established, or image data and especially design data displayed true to position.

Figure 4J:
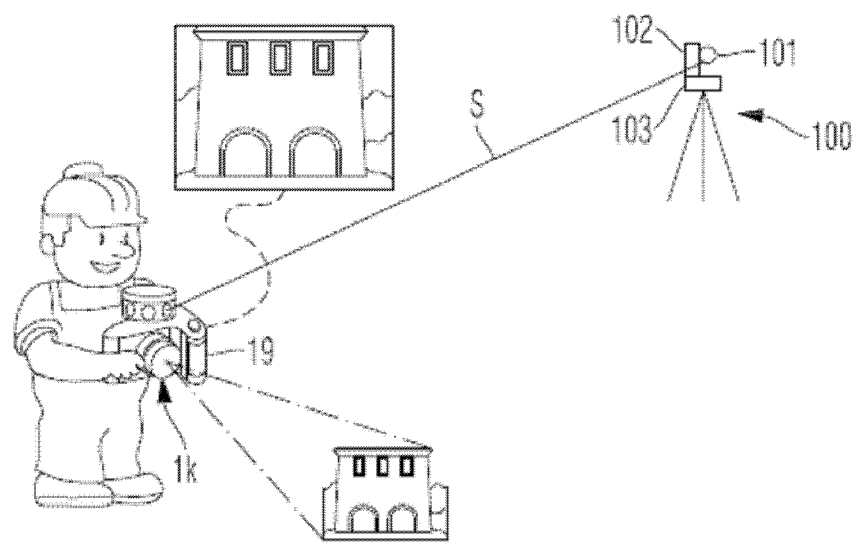

The position determination system shown in FIG. 4J differs from the position determination system shown in FIG. 4B especially in that the laser range finder is replaced by a camera. The distance between the target and the camera can be measured either by the camera itself or determined separately or given in advance. Alternatively, a distance measurement is not even necessary. In this way, it is possible to create images with a georeference (georeferenced pictures).

Figure 4K:
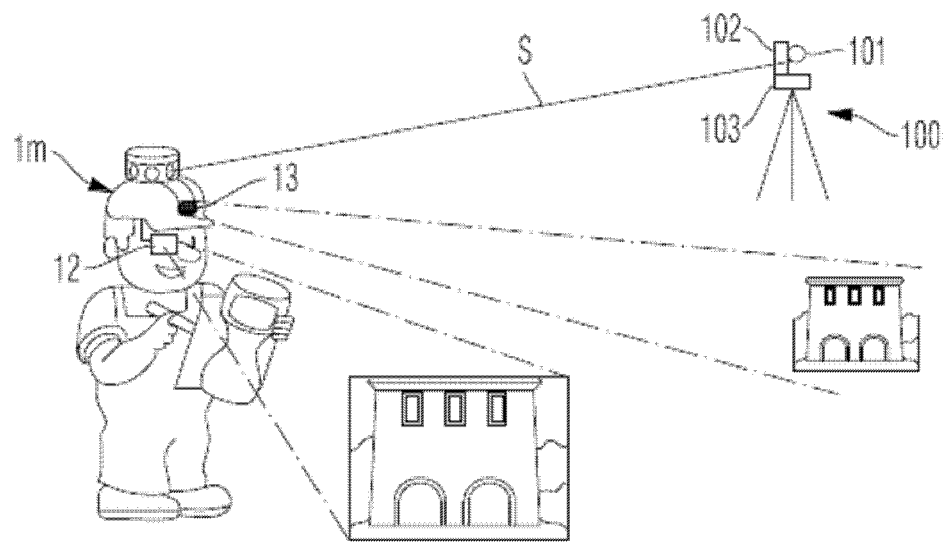

The position determination system shown in FIG. 4K differs from the position determination system shown in FIG. 4D especially in that a head-mounted display 12 is also carried by the helmet serving as the geodetic target 1m. In this way, CAD data can be incorporated true to position for a user.

Figure 5:
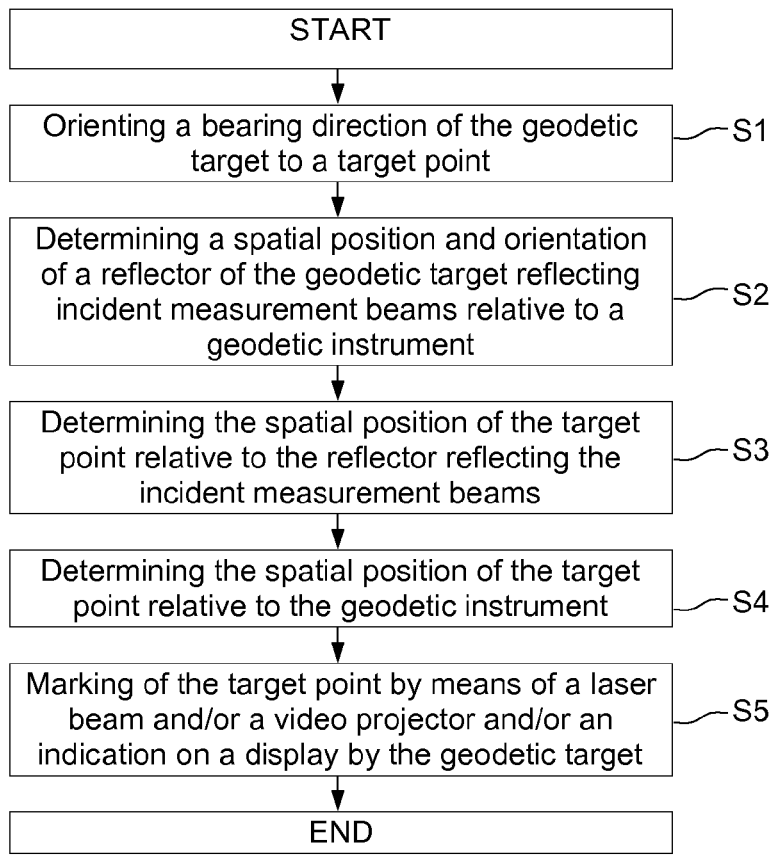
FIG. 5 shows a flow chart of a method for determining target points.
Figure 6:
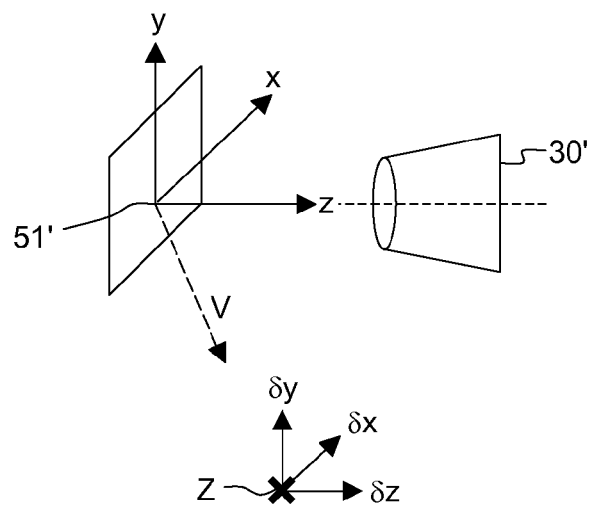
FIG. 6 shows schematically the position of the target point in a system of coordinates of the geodetic target.

In what follows, reference will be made to FIG. 5 to describe a method for establishing target points according to one embodiment per a flow chart.

In a first step S1, there is an orienting of a bearing direction of a geodetic target to a target point.

Step S1 here can involve the determining of a distance between a reflector of the geodetic target and the target point, if this distance is not given in advance by the geometry of the geodetic target.

Next, in a step S2, one determines a spatial position and orientation of a reflector of the geodetic target, reflecting incident measurement beams, relative to a geodetic instrument.

Next, in step S3, the spatial position of the target point is determined relative to the reflector of the geodetic target that reflects incident measurement beams.

Next, in step S4, the spatial position of the target point is determined relative to the geodetic instrument.

In an optional additional step S5, the target point is marked by means of a laser beam and/or a video projection and/or an indication of a display by the geodetic target. After this, the method can begin over again.

The invention claimed is:

1. Geodetic target, comprising:
an orienting device with a bearing direction;
a first inclinometer with a first axis of inclination, the first inclinometer configured to determine an inclination of the geodetic target about the first axis of inclination;
a reflector configured to reflect a first portion of a measurement beam that is generated by a source external to the geodetic target and that is incident on the reflector, the reflector configured to reflect the first portion of the measurement beam in a direction substantially towards the source;

an imaging optics configured to focus a second portion of the measurement beam that is incident on the imaging optics;

a matrix sensor, whose receiving surface is situated in an image plane of the imaging optics, the imaging optics configured to focus the second portion of the measurement beam in an image point on the matrix sensor; and an interface, which is connected to the first inclinometer and the matrix sensor;

wherein a spatial arrangement and orientation of an axis of symmetry of the reflector relative to the bearing direction of the orienting device is predetermined;

wherein the first axis of inclination makes an angle a different from zero with an optical axis of the imaging optics;

wherein the optical axis of the imaging optics coincides with the axis of symmetry of the reflector or is parallel to it;

wherein a location of the image point on the matrix sensor is dependent on an orientation of the reflector relative to the second portion of the measurement beam; and wherein the interface is designed to put out signals received from the first inclinometer and the matrix sensor to determine a spatial orientation of the reflector relative to a target point lying in the bearing direction.

2. Geodetic target according to claim 1,
wherein the orienting device is a range finder that includes a laser range finder or a laser projector or a camera or a display or a video projector; and
wherein the interface is connected to the orienting device and designed to put out the signals received from the first inclinometer, the matrix sensor and the orienting device to determine a spatial position and the spatial orientation of the reflector relative to the target point.

3. Geodetic target according to claim 2,
wherein the geodetic target further comprises a second inclinometer with a second axis of inclination, wherein the first axis of inclination of the first inclinometer and the second axis of inclination of the second inclinometer make an angle β different from zero; or
wherein the first inclinometer has a second axis of inclination, wherein the first axis of inclination of the first inclinometer and the second axis of inclination of the first inclinometer make an angle β different from zero.

4. Geodetic target according to claim 2, further comprising a control system configured to receive the signals put out by the interface, which control system uses the signals to determine the spatial position and the spatial orientation of the reflector relative to the target point.

5. Geodetic target according to claim 2, wherein the geodetic target is integrated in a helmet, a projector, or a machine tool.

6. Geodetic target according to claim 1,
wherein the orienting device is a survey rod or a ranging rod or a rover rod or a tool or a drill or a spacer; and
wherein the interface is designed to put out the signals received by the first inclinometer and the matrix sensor, as well as an arrangement and dimensioning of the orienting device, to determine a spatial position and the spatial orientation of the reflector relative to the target point.

7. Geodetic target according to claim 6, wherein the geodetic target is integrated in a helmet, a projector, or a machine tool.

8. Geodetic target according to claim 1, comprising at least two reflectors with corresponding imaging optics as well as a mirror arrangement, wherein the mirror arrangement is situated along the optical axes of the imaging optics between the imaging optics and the matrix sensor.

9. Geodetic target according to claim 8, further comprising a filter arranged between the receiving surface of the matrix sensor and the imaging optics or between the receiving surface of the matrix sensor and the reflector.

10. Geodetic target according to claim 8,
wherein the geodetic target further comprises a second inclinometer with a second axis of inclination, wherein the first axis of inclination of the first inclinometer and the second axis of inclination of the second inclinometer make an angle β different from zero; or
wherein the first inclinometer has a second axis of inclination, wherein the first axis of inclination of the first inclinometer and the second axis of inclination of the first inclinometer make an angle β different from zero.

11. Geodetic target according to claim 8, further comprising a control system configured to receive the signals put out by the interface, which control system uses the signals to determine the spatial orientation of the reflector relative to the target point.

12. Geodetic target according to claim 8, wherein the geodetic target is integrated in a helmet, a projector, or a machine tool.

13. Geodetic target according to claim 1, further comprising a filter arranged between the receiving surface of the matrix sensor and the imaging optics or between the receiving surface of the matrix sensor and the reflector.

14. Geodetic target according to claim 1,
wherein the geodetic target further comprises a second inclinometer with a second axis of inclination, wherein the first axis of inclination of the first inclinometer and the second axis of inclination of the second inclinometer make an angle β different from zero; or
wherein the first inclinometer has a second axis of inclination, wherein the first axis of inclination of the first inclinometer and the second axis of inclination of the first inclinometer make an angle β different from zero.

15. Geodetic target according to claim 14, further comprising a control system configured to receive the signals put out by the interface, which control system uses the signals to determine the spatial orientation of the reflector relative to the target point.

16. Geodetic target according to claim 14, wherein the geodetic target is integrated in a helmet, a projector, or a machine tool.

17. Geodetic target according to claim 1, further comprising a control system configured to receive the signals put out by the interface, which control system uses the signals to determine the spatial orientation of the reflector relative to the target point based on the inclination of the geodetic target about the first axis of inclination and a position of the image point on the matrix sensor.

18. Geodetic target according to claim 17, wherein the geodetic target is integrated in a helmet, a projector, or a machine tool.

19. Geodetic target according to claim 1, wherein the geodetic target is integrated in a helmet, a projector, or a machine tool.

20. Position determining system for geodesy, comprising:
a geodetic target according to claim 1, and a geodetic instrument;

wherein the geodetic instrument comprises a measurement device configured to determine a spatial position of the reflector relative to the geodetic instrument; and wherein the geodetic instrument comprises a control system, which is designed to receive the signals put out by the interface of the geodetic target and to use the signals, as well as the spatial position determined by the measurement device of the reflector relative to the geodetic instrument to determine a relative position of the target point to the geodetic instrument.

21. Position determining system according to claim 20, wherein the geodetic instrument comprises a location determining device that determines an absolute position of the geodetic instrument; and wherein the control system of the geodetic instrument is designed to receive the signals put out by the interface of the geodetic target and to use the signals as well as the spatial position of the reflector as determined by the measurement device and the absolute position of the geodetic instrument as determined by the location determining device, to determine an absolute position of the target point.

22. Position determining system according to claim 20, wherein the control system of the geodetic instrument and the interface of the geodetic target are designed to synchronize the determination of the spatial position of the reflector by the measurement device with the putting out of the signals by the interface to determine the spatial orientation of the reflector relative to the target point lying in the bearing direction.

23. Method for establishing target points by using the position determining system according to claim 20, having the following steps:

orienting the bearing direction of the geodetic target to the target point;

determining the spatial position of the reflector of the geodetic target relative to the geodetic instrument;

determining the spatial position of the target point relative to the reflector; and determining the spatial position of the target point relative to the geodetic instrument.

24. Method according to claim 23, further comprising marking of the target point by means of a laser beam or a video projection or indication of a display by the geodetic target.

25. Geodetic target according to claim 1, wherein the interface is configured to use the signals to determine the spatial orientation of the reflector relative to the target point based on the inclination of the geodetic target about the first axis of inclination and a position of the image point on the matrix sensor.

* * * * *